United States Patent
Takezawa et al.

(10) Patent No.: US 8,257,869 B2
(45) Date of Patent: Sep. 4, 2012

(54) ELECTRODE FOR ELECTROCHEMICAL ELEMENT AND ELECTROCHEMICAL ELEMENT USING THE ELECTRODE

(75) Inventors: Hideharu Takezawa, Nara (JP); Shoichi Imashiku, Osaka (JP); Kaoru Nagata, Osaka (JP); Takashi Otsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/601,661

(22) PCT Filed: May 15, 2008

(86) PCT No.: PCT/JP2008/001211
§ 371 (c)(1),
(2), (4) Date: Nov. 24, 2009

(87) PCT Pub. No.: WO2008/149492
PCT Pub. Date: Dec. 11, 2008

(65) Prior Publication Data
US 2010/0320080 A1    Dec. 23, 2010

(30) Foreign Application Priority Data
Jun. 1, 2007    (JP) .................................. 2007-146417

(51) Int. Cl.
H01M 4/70    (2006.01)
H01M 4/02    (2006.01)

(52) U.S. Cl. ..................... 429/238; 429/218.1; 429/233

(58) Field of Classification Search .................. 429/238, 429/233
See application file for complete search history.

(56) References Cited

U.S. PATENT DOCUMENTS

| 6,887,623 B2 * | 5/2005 | Fujimoto et al. ............. 429/232 |
| 7,794,878 B2 * | 9/2010 | Kogetsu et al. ............. 429/218.1 |
| 2007/0031733 A1 | 2/2007 | Kogetsu et al. |
| 2009/0104528 A1 | 4/2009 | Takahashi et al. |

FOREIGN PATENT DOCUMENTS

| JP | 2002-279974 A | 9/2002 |
| JP | 2003-017040 A | 1/2003 |
| JP | 2004-127561 A | 4/2004 |
| JP | 2005-196970 A | 7/2005 |
| JP | 2006-172973 A | 6/2006 |
| JP | 2008-103231 A | 5/2008 |
| WO | WO 2007/015419 A1 | 2/2007 |
| WO | WO 2007/052803 A1 | 5/2007 |

OTHER PUBLICATIONS

International Search Report for International Application No. PCT/JP2008/001211, dated Aug. 19, 2008, 2 pages.

* cited by examiner

*Primary Examiner* — John S Maples
(74) *Attorney, Agent, or Firm* — Brinks Hofer Gilson & Lione

(57) ABSTRACT

An electrode for an electrochemical element reversibly absorbing and releasing lithium ions including: a current collector having a higher first convex portion and a lower second convex portion on at least one surface thereof; a columnar body including an active material formed in such a manner as to rise obliquely on the first convex portion and the second convex portion of the current collector.

11 Claims, 11 Drawing Sheets discharge charge discharge discharge charge discharge charge

ELECTRODE FOR ELECTROCHEMICAL ELEMENT AND ELECTROCHEMICAL ELEMENT USING THE ELECTRODE

TECHNICAL FIELD

The present invention relates to an electrochemical element excellent in charge and discharge characteristic. More particularly, it relates to an electrode for an electrochemical element excellent in capacity maintenance rate, high-rate characteristic and low-temperature characteristic, and an electrochemical element using the electrode.

BACKGROUND ART

Recently, as an electrochemical element, for example, a lithium ion secondary battery as a typical example of a non-aqueous electrolyte secondary battery has been widely used because it has a high electromotive force and a high energy density while it is light. Demands for lithium ion secondary batteries are increasing for a driving power supply of various kinds of portable electronic equipment such as a cellular phone, a digital camera, a video camera, and a notebook-sized personal computer, as well as mobile telecommunication equipment.

A lithium ion secondary battery includes a positive electrode including a lithium-containing composite oxide; a negative electrode including a negative electrode active material absorbing and releasing lithium metals, lithium alloys or lithium ions; and an electrolyte.

Recently, instead of carbon materials such as graphite that have been conventionally used as a negative electrode material, elements having a property of absorbing lithium ions and having a theoretical capacity density of more than 833 mAh/cm$^3$ have been studied and reported. An example of the elements for a negative electrode active material, which have a theoretical capacity density of more than 833 mAh/cm$^3$, includes silicon (Si), tin (Sn), germanium (Ge) to be alloyed with lithium, and oxide and alloys thereof. Among them, since silicon-containing particles such as Si particles and silicon oxide particles are cheap, they have been widely studied.

However, these elements increase their volume when they absorb lithium ions at the time of charging. For example, when the negative electrode active material is Si and Si is changed to $Li_{4.4}Si$, the volume is increased by 4.12 times as the volume at the time of discharging, where $Li_{4.4}Si$ denotes the state in which the maximum amount of lithium ions is absorbed.

Therefore, in particular, when a thin film of the above-mentioned elements is deposited on a current collector by a CVD method, a sputtering method, or the like, so as to form a negative electrode active material, a negative electrode active material expands/contracts by absorption/release of lithium ions. Exfoliation of a negative electrode active material from a negative electrode current collector may occur because of deterioration in adhesion while charge and discharge cycles are repeated.

In order to solve the above-mentioned problems, a method of providing convex and concave portions on the surface of a current collector, depositing a negative electrode active material thin film thereon, and forming gaps in the thickness direction by etching is disclosed (see, for example, patent document 1). Similarly, a method of providing convex and concave portions on the surface of a current collector, forming resist patterns so that convex portions become opening, electro-depositing a negative electrode active material thereon, and then removing the resist, thus forming a columnar body (see, for example, patent document 2). Furthermore, a method of disposing a mesh above the current collector, and depositing a negative electrode active material thin film through the mesh, thereby suppressing the deposition of the negative electrode active material in a region corresponding to the frame of the mesh is proposed (see, for example, patent document 3).

Furthermore, a method of providing convex and concave portions on a surface of a current collector and forming a film-like negative electrode material thereon in a way in which the negative electrode material is inclined with respect to the surface perpendicular to a main surface of the negative electrode material is disclosed (see, for example, patent document 4). This shows that stress generated by expansion and contraction of charge and discharge can be distributed into the parallel direction and the vertical direction to the surface of the negative electrode material, thereby suppressing the generation of wrinkles and exfoliation.

In secondary batteries shown in patent documents 1 to 3, a thin film of a negative electrode active material is formed in a columnar shape and gaps are provided between the columnar shapes, thus preventing exfoliation and wrinkles from occurring. However, since the negative electrode active material contracts at the time when charge is started, a metal surface of the current collector may be exposed through gaps. Thereby, since the exposed current collector faces the positive electrode at the time of charging, lithium metal tends to be precipitated, which may reduce safety and capacity. Furthermore, when the height of the columnar negative electrode active material is increased or the gap interval is reduced in order to increase battery capacity, in particular, since the tip (opening end) of the columnar negative electrode active material is not regulated by the current collector and the like, it expands more as compared with the vicinity of the current collector with the proceeding of charging. As a result, columnar negative electrode active materials are brought into contact with each other and pushed to each other in the vicinity of the tip. Thereby, the exfoliation between the current collector and the negative electrode active material and wrinkle of the current collector may occur. On the other hand, when the interval between gaps is increased in order to avoid contact between negative electrode active materials at the time of expansion, lithium metal tends to be precipitated. In other words, in the above-mentioned secondary batteries, exfoliation between the current collector and the negative electrode active material and wrinkles in the current collector cannot be prevented. Furthermore, since an electrolytic solution is trapped in the gaps in the columnar-shaped negative electrode active materials that have been expanded and brought into contact with each other, movement of lithium ions when discharge is started is prevented. As a result, in particular, there have been problems in characteristic of discharge at a high rate (hereinafter, referred to as "high-rate discharge") or discharge at a low temperature environment.

Furthermore, in a structure of a secondary battery disclosed in patent document 4, as shown in FIG. 11A, with negative electrode active material 53 formed by inclining (at an angle θ), current collector 51 can be prevented from being exposed. Then, precipitation of lithium metal can be prevented in advance. However, similar to patent documents 1-3, as shown in FIG. 11B, negative electrode active material 53 larger expands as compared with the vicinity of current collector 51 with the proceeding of charging. Consequently, columnar negative electrode active materials are brought into contact with each other in the vicinity of the tips and pushed to each other as shown by arrows in FIG. 11B. As a result, exfoliation between current collector 51 and negative electrode active material 53 and wrinkles in current collector 51 may occur. Furthermore, stress by expansion and contraction on the negative electrode active material concentrates on a connection interface between the negative electrode active material and the convex portion. As a result, as the charge and discharge cycle proceeds, a negative electrode active material may be peeled off from the connection interface on the convex portion due to the stress, thus reducing the reliability. Furthermore, since an electrolytic solution is trapped in gaps 55 between columnar shaped negative electrode active materials that have been expanded and brought into contact with each other, movement of lithium ions is prevented when discharge is started. In particular, there has been a problem in discharge characteristic of high-rate discharge, discharge in a low-temperature environment, and the like.

[Patent document 1] Japanese Patent Application Unexamined Publication No. 2003-17040
[Patent document 2] Japanese Patent Application Unexamined Publication No. 2004-127561
[Patent document 3] Japanese Patent Application Unexamined Publication No. 2002-279974
[Patent document 4] Japanese Patent Application Unexamined Publication No. 2005-196970

SUMMARY OF THE INVENTION

The present invention provides an electrode for an electrochemical element reversibly absorbing and releasing lithium ions, which includes a current collector having a higher first convex portion and a lower second convex portion on at least one surface thereof; and a columnar body including an active material formed in such a manner as to rise obliquely on the first convex portion and the second convex portion of the current collector.

Thus, by forming columnar bodies on convex portions having different heights, the interval between the columnar bodies can be effectively increased, thus avoiding the contact between the columnar bodies at the time of expansion. Furthermore, since columnar bodies can be formed in gaps between the convex portions of one height, the amount of the active material can be increased and therefore the capacity can be increased.

Furthermore, the electrochemical element of the present invention includes the above-mentioned electrode for an electrochemical element, an electrode capable of reversibly absorbing and releasing lithium ions, and a non-aqueous electrolyte. Thus, an electrochemical element having high capacity and a long lifetime can be obtained.

REFERENCE MARKS IN THE DRAWINGS

Figure 1:
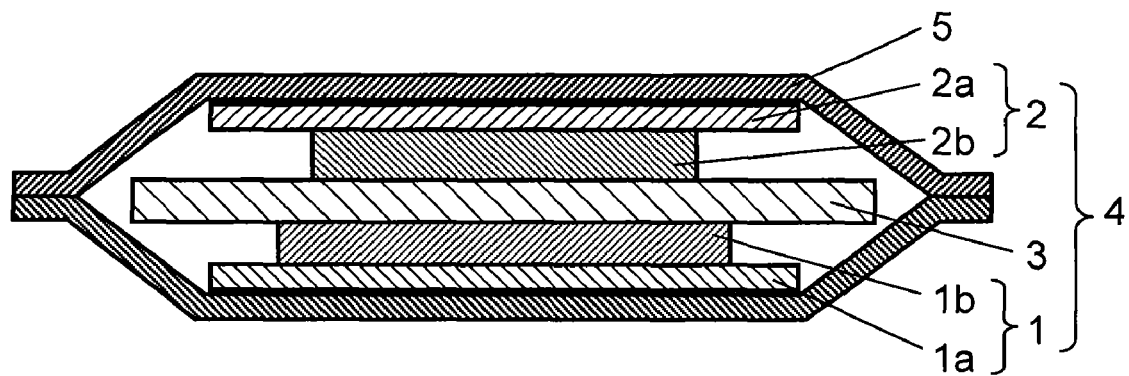
FIG. 1 is a sectional view showing a non-aqueous electrolyte secondary battery in accordance with a first exemplary embodiment of the present invention.

| | |
|---|---|
| 1, 20 | negative electrode |
| 1a | current collector |
| 1b, 15, 25, 35 | columnar body |
| 2, 17 | positive electrode |
| 2a | positive current collector |
| 2b | positive electrode mixture layer |
| 3 | separator |
| 4 | electrode group |
| 5 | external case |
| 11, 51 | current collector |
| 12 | concave portion |
| 13a | first convex portion |
| 13b | second convex portion |
| 13c | edge portion |
| 18 | electrolytic solution (non-aqueous electrolyte) |
| 25a | lower side |
| 25b | upper side |
| 40 | manufacturing apparatus |
| 41 | vacuum chamber |
| 42 | gas introducing tube |
| 43 | fixing stand |
| 45 | nozzle |
| 46 | vapor deposition source |
| 47 | vacuum pump |
| 53 | negative electrode active material |
| 55 | gap |
| 251 | first columnar body portion |
| 252 | second columnar body portion |
| 253 | third columnar body portion |

DETAILED DESCRIPTION OF THE PREFERRED EMBODIMENT

Hereinafter, the exemplary embodiments of the present invention are described with reference to drawings. The same reference numerals are given to the same parts. Note here that the present invention is not particularly limited to the below described contents as long as it is based on the basic prefectures described in this specification. Furthermore, an example of an electrochemical element includes a non-aqueous electrolyte secondary battery such as a lithium ion secondary battery and a capacitative element such as a lithium ion capacitor. Hereinafter, in particular, a negative electrode for a non-aqueous electrolyte secondary battery is described as an example of the electrode for an electrochemical element, and a non-aqueous electrolyte secondary battery is described as an example of the electrochemical element but they are not necessarily limited to these examples.

First Exemplary Embodiment

FIG. 1 is a sectional view showing a non-aqueous electrolyte secondary battery in accordance with a first exemplary embodiment of the present invention. As shown in FIG. 1, a laminated type non-aqueous electrolyte secondary battery (hereinafter, also referred to as a "battery") has electrode group 4 including negative electrode 1 described in detail below; positive electrode 2 facing negative electrode 1 and reducing lithium ions at the time of discharging; and porous separator 3 disposed between negative electrode 1 and positive electrode 2 and preventing negative electrode 1 and positive electrode 2 from being brought into direct contact with each other. Electrode group 4 and non-aqueous electrolyte (not shown) having lithium ion conductivity are accommodated in external case 5. Separator 3 is impregnated with the non-aqueous electrolyte having lithium ion conductivity. Furthermore, one end of a positive electrode lead (not shown) and one end of a negative electrode lead (not shown) are coupled to positive electrode current collector 2a and negative electrode current collector 1a, respectively. The other ends thereof are led out to the outside of external case 5. Furthermore, an opening of external case 5 is sealed with a resin material. Then, positive electrode 2 includes positive electrode current collector 2a and positive electrode mixture layer 2b supported by positive electrode current collector 2a.

Furthermore, as mentioned below in detail, negative electrode 1 includes negative electrode current collector (hereinafter, referred to as "current collector") 1a having a higher first convex portion, a lower second convex portion and a concave portion; and a columnar body formed in such a manner as to rise obliquely on the first convex portion and the second convex portion. The first convex portion and the second convex portion are provided in rows in the direction in which the columnar body rises obliquely, and they are alternatively disposed in the direction orthogonal to the direction in which the columnar body rises obliquely.

Herein, positive electrode mixture layer 2b includes a lithium-containing composite oxide such as $LiCoO_2$, $LiNiO_2$, $LiMn_2O_4$, or a mixed compound or a composite compound thereof as the positive electrode active material. As the positive electrode active material, in addition to the above-mentioned materials, olivine-type lithium phosphate expressed by the general formula: $LiMPO_4$ (M=V, Fe, Ni and Mn) and lithium fluorophosphate expressed by the general formula: $Li2MPO4F$ (M=V, Fe, Ni and Mn) can be used. Furthermore, a part of these lithium-containing compounds may be replaced with a different element. Furthermore, the surface of lithium-containing compounds may be treated with metallic oxide, lithium oxide, conductive agent, and the like, or the surface may be subjected to hydrophobic treatment.

Positive electrode mixture layer 2b further includes a conductive agent and a binder. An example of the conductive agent may include graphites including natural graphites and artificial graphites; carbon blacks such as acetylene black, Ketjen black, channel black, furnace black, lampblack and thermal black; conductive fibers such as carbon fiber and metal fiber; carbon fluoride; metal powders such as aluminum powders; conductive whiskers of zinc oxide, potassium titanate, and the like; conductive metallic oxide such as titanium oxide; an organic conductive material such as phenylene derivatives, and the like.

An example of the binder may include PVDF, polytetrafluoroethylene, polyethylene, polypropylene, aramid resin, polyamide, polyimide, polyamideimide, polyacrylonitrile, polyacrylic acid, polymethylacrylate, polyethylacrylate, polyhexylacrylate, polymethacrylic acid, polymethylmethacrylate, polyethylmethacrylate, polyhexylmethacrylate, polyvinyl acetate, polyvinylpyrrolidone, polyether, polyethersulfone, hexafluoropolypropylene, styrene-butadiene rubber, carboxymethylcellulose, and the like. Furthermore, a copolymer of two or more kinds of materials selected from tetrafluoroethylene, hexafluoroethylene, hexafluoropropylene, perfluoro-alkylvinyl ether, vinylidenefluoride, chlorotrifluoroethylene, ethylene, propylene, pentafluoropropylene, fluoromethylvinyl ether, acrylic acid, and hexadiene, may be used. Furthermore, a mixture including two or more of them may be used.

As positive electrode current collector 2a used for positive electrode 2, aluminum (Al), carbon, conductive resin, and the like, can be used. Any of these materials may be subjected to surface treatment with carbon and the like.

As the non-aqueous electrolyte, an electrolytic solution in which a solute is dissolved in an organic solvent, and a so-called polymer electrolyte layer including the electrolytic solution and non-fluidized with a macromolecule can be used. At least when an electrolytic solution is used, it is preferable that separator 3 is disposed between positive electrode 2 and negative electrode 1, and separator 3 is impregnated with an electrolytic solution. Separator 3 is formed of a single layer or a plurality of layers of a non-woven fabric or microporous membrane made of polyethylene, polypropylene, aramid resin, amide-imide, polyphenylene sulfide, polyimide, and the like. Furthermore, inside or on the surface of separator 3, a heat resistant filler of alumina, magnesia, silica, titania, and the like, may be included. Besides separator 3, a heat resistant layer formed of these fillers and a binder similar to that used for positive electrode 2 and negative electrode 1 may be provided.

The material of the non-aqueous electrolyte is selected based on the oxidation-reduction potential of each active material. The solute preferred to be used for a non-aqueous electrolyte includes $LiPF_6$, $LiBF_4$, $LiClO_4$, $LiAlCl_4$, $LiSbF_6$, $LiSCN$, $LiCF_3SO_3$, $LiNCF_3CO_2$, $LiAsF_6$, $LiB_{10}Cl_{10}$, lower aliphatic lithium carboxylate, LiF, LiCl, LiBr, LiI, chloroborane lithium, borates such as lithium bis(1,2-benzenedioleate (2-)-O,O')borate, lithium bis(2,3-naphthalenedioleate(2-)-O, O')borate, lithium bis(2,2'-biphenyldioleate(2-)-O,O')borate, lithium bis(5-fluoro-2-oleate-1-benzenesulfonate-O,O')borate, $(CF_3SO_2)2NLi$, $LiN(CF_3SO_2)(C_4F_9SO_2)$, $(C_2F_5SO_2)_2NLi$, and lithium tetraphenyl borate, and the like. Thus, salts generally used for a lithium battery can be applied.

Furthermore, an example of the organic solvent for dissolving the above-mentioned salts can include ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxy methane, tetrahydrofuran, tetrahydrofuran derivative such as 2-methyltetrahydrofuran, dimethyl sulfoxide, 1,3-dioxolane, dioxolane derivative such as 4-methyl-1, 3-dioxolane, formamide, acetamide, dimethylformamide, acetonitrile, propyl nitrile, nitromethane, ethyl monoglyme, phosphotriester, acetic acid ester, propionic acid ester, sulfolane, 3-methyl sulfolane, 1,3-dimethyl-2-imidazolidinone, 3-methyl-2-oxazolidinone, propylene carbonate derivative, ethyl ether, diethyl ether, 1,3-propanesultone, anisole, fluorobenzene, and a mixture of one or more of them. Solvents generally used in a lithium battery can be applied.

Furthermore, additives such as vinylene carbonate, cyclohexylbenzene, biphenyl, diphenyl ether, vinyl ethylene carbonate, divinyl ethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, m-terphenyl, and the like, may be included.

The non-aqueous electrolyte may be used as a solid electrolyte by mixing one polymer material or a mixture of one or more of the polymer materials with the above-mentioned solute. An example of the polymer material includes polyethylene oxide, polypropylene oxide, polyphosphazene, polyaziridine, polyethylene sulfide, polyvinyl alcohol, polyvinylidene-fluoride, polyhexafluoropropylene, and the like. Furthermore, the non-aqueous electrolyte may be used in a gel state by mixing it with the above-mentioned organic solvents. Furthermore, an inorganic material such as lithium nitride, lithium halide, lithium oxoate, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, and a phosphorus sulfide compound may be used as the solid electrolyte. When a gel-like non-aqueous electrolyte is used, the gel-like non-aqueous electrolyte instead of separator 3 may be disposed between positive electrode 2 and negative electrode 1. Gel-like non-aqueous electrolyte may be disposed in a neighboring portions of separator 3.

Then, as current collector 11 of negative electrode 1, metal foils of stainless steel, nickel, copper, titanium, and the like, and thin film of carbon and conductive resin are used. Furthermore, surface treatment may be carried out by using carbon, nickel, titanium, and the like.

Furthermore, it is possible to use a negative electrode active material, for example, silicon (Si), tin (Sn), reversibly absorbing and releasing lithium ions and having a theoretical capacity density of more than 833 mAh/cm$^3$ as columnar body 1b of negative electrode 1. Such a negative electrode active material can exert the effect of the present invention regardless of whether such a material is any of an elemental substance, an alloy, a compound, a solid solution and a composite active material including a silicon-containing material or a tin-containing material. That is to say, an example of the silicon-containing materials may include Si, $SiO_x$ (0<x≦2.0), or an alloy, a compound or a solid solution of any of the above-mentioned materials in which a part of Si is replaced with at least one element selected from the group consisting of Al, In, Cd, Bi, Sb, B, Mg, Ni, Ti, Mo, Co, Ca, Cr, Cu, Fe, Mn, Nb, Ta, V, W, Zn, C, N, and Sn. An example of the tin-containing materials may include $Ni_2Sn_4$, $Mg_2Sn$, $SnO_x$ (0<x<2), $SnO_2$, $SnSiO_3$, LiSnO, and the like.

These materials may be used for forming negative electrode active material singly or in combination with plural kinds of materials. An example of formation of a negative electrode active material by using plural kinds of materials mentioned above may include a compound containing Si, oxygen and nitrogen or a composite of plurality of compounds containing Si and oxygen with different constituting ratios.

Hereinafter, a negative electrode for a non-aqueous electrolyte secondary battery (hereinafter, also referred to as "negative electrode") in accordance with the first exemplary embodiment of the present invention is described in detail with reference to FIGS. 2A-2D and 3A-3D. Hereinafter, for example, a negative electrode active material (hereinafter, referred to as "active material") expressed by $SiO_x$ (0≦x<2.0) including at least silicon is described as an example.

Figure 2A:
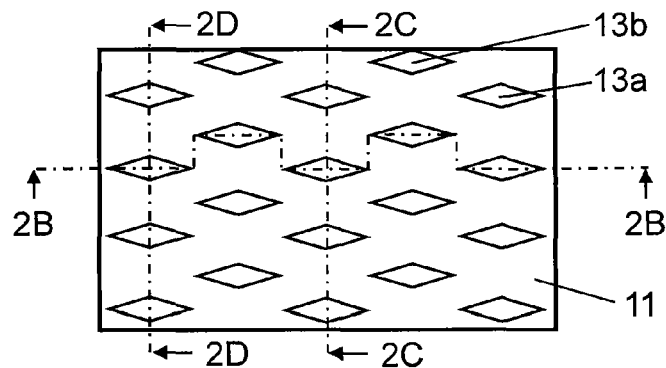
FIG. 2A is a schematic plan view showing a structure of a negative electrode before charging in accordance with the first exemplary embodiment of the present invention.
Figure 2B:
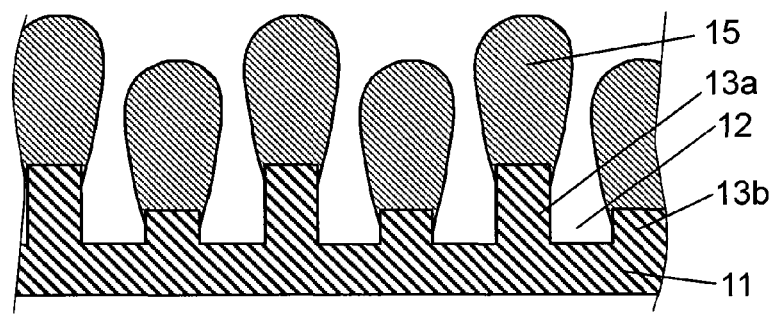
FIG. 2B is a sectional view taken along lines 2B-2B in FIG. 2A.
Figure 2C:
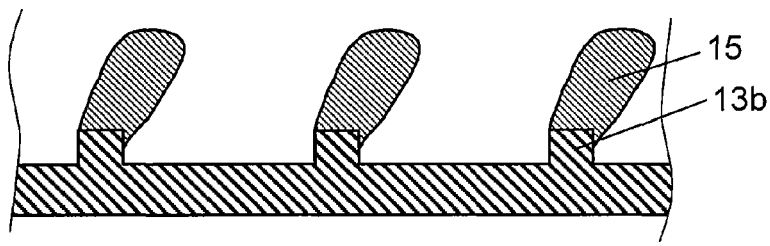
FIG. 2C is a sectional view taken along lines 2C-2C in FIG. 2A.
Figure 2D:
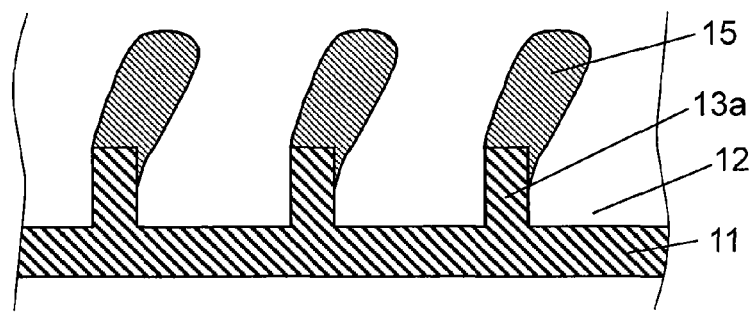
FIG. 2D is a sectional view taken along lines 2D-2D in FIG. 2A.
Figure 3A:
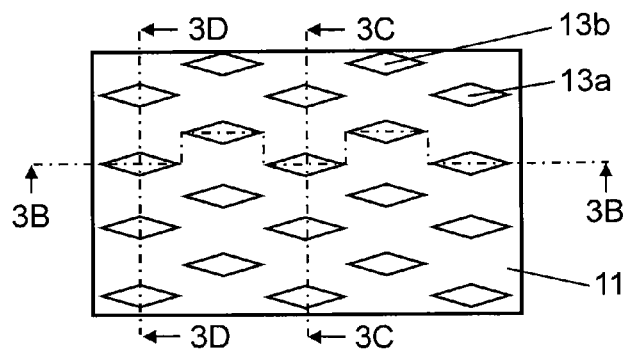
FIG. 3A is a schematic plan view showing a structure of a negative electrode after charging in accordance with the first exemplary embodiment of the present invention.
Figure 3B:
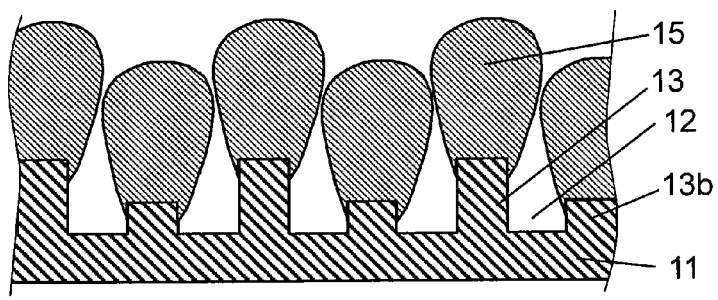
FIG. 3B is a sectional view taken along lines 2B-2B in FIG. 2A.
Figure 3C:
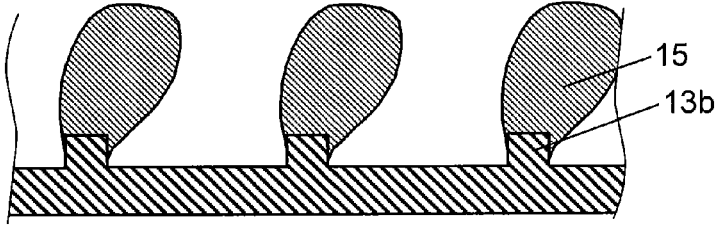
FIG. 3C is a sectional view taken along lines 2C-2C in FIG. 2A.
Figure 3D:
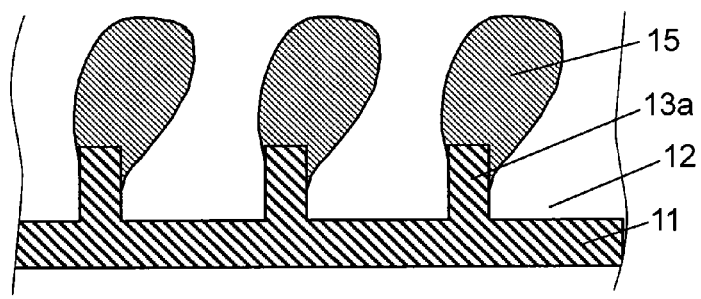
FIG. 3D is a sectional view taken along lines 2D-2D in FIG. 2A.

FIG. 2A is a schematic plan view showing a structure of a negative electrode before charging in accordance with the first exemplary embodiment of the present invention. FIG. 2B is a sectional view taken along lines 2B-2B in FIG. 2A. FIG. 2C is a sectional view taken along lines 2C-2C in FIG. 2A. FIG. 2D is a sectional view taken along lines 2D-2D in FIG. 2A. FIG. 3A is a schematic plan view showing a structure of the negative electrode after charging in accordance with the first exemplary embodiment of the present invention. FIG. 3B is a sectional view taken along lines 2B-2B in FIG. 2A. FIG. 3C is a sectional view taken along lines 2C-2C in FIG. 2A. FIG. 3D is a sectional view taken along lines 2D-2D in FIG. 2A. In FIGS. 2A and 3A, for easy understanding of the position relation between first convex portion 13a and second convex portion 13b of current collector 11, a columnar body is not shown.

As shown in FIGS. 2A and 2B, concave portion 12, higher first convex portion 13a and lower second convex portion 13b are provided on at least the upper surface of current collector 11 made of a conductive metal material such as copper foil. Then, as shown in FIG. 2B, on the upper parts of first convex portion 13a and second convex portion 13b, an active material expressed by SiO$_x$ constituting negative electrode 1 is formed in a form of obliquely rising columnar body 15 by an oblique vapor deposition method using, for example, a sputtering method or a vacuum evaporation method. At this time, as shown in FIGS. 2A, 2C and 2D, first convex portion 13a and second convex portion 13b are provided in rows in the direction in which columnar body 15 rises obliquely. Then, as shown in FIG. 2B, first convex portions 13a and second convex portions 13b are disposed, for example, alternately via concave portions 12 in the direction orthogonal to the direction in which columnar body 15 rises obliquely. At this time, it is preferable that first convex portion 13a and second convex portion 13b are disposed not linearly but in a zigzag shape in the direction orthogonal to the direction in which columnar body 15 rises obliquely. Thus, contact of columnar bodies 15 can be further alleviated.

Furthermore, a disposing interval is appropriately set depending upon heights of first convex portion 13a and second convex portion 13b, and a flying angle of the active material of obliquely rising columnar body 15. However, the disposing interval is not particularly limited as long as columnar bodies 15 can be formed discretely on first convex portion 13a and second convex portion 13b of current collector 11.

As shown in FIGS. 3B to 3D, at the time of charging, columnar body 15 absorbs lithium ions released from a positive electrode (not shown) and expands. At this time, contact between the columnar bodies, which occur when the convex portions have the same height, can be considerably reduced by forming first convex portion 13a and second convex portion 13b having different heights at the same disposing intervals. In particular, the effect is exhibited remarkably since the position in the height direction of the maximum expanding diameter of the columnar body 15 on first convex portion 13a and that on second convex portion 13b are not overlapped with each other in the direction orthogonal to the direction in which the columnar body rises obliquely.

According to this exemplary embodiment, by forming columnar bodies on the first convex portion and the second convex portion having different heights, deformation such as wrinkles of the current collector because of contact between the columnar bodies can be prevented. Furthermore, when the first convex portion and second convex portion are formed at the same interval as in a conventional example, the columnar bodies are not brought into contact with each other when the columnar body expands by absorbing lithium ions. Therefore, a larger amount of lithium ions can be absorbed. Similarly, given that expansion of the columnar bodies are the same, the disposing interval of the first convex portions and the second convex portions that can be formed on the current collector can be narrowed, resulting in forming a larger number of the columnar bodies. As a result, the capacity of the secondary battery can be increased.

Furthermore, according to this exemplary embodiment, since the columnar bodies are not easily brought into contact with each other, stress is not easily concentrated on the connection interface between the first and second convex portions and the columnar body. As a result, it is possible to obtain a secondary battery having excellent reliability in which deterioration of the charge and discharge cycle characteristic due to expansion and contraction of the negative electrode does not easily occur when lithium ions are absorbed and released.

Furthermore, according to this exemplary embodiment, since the columnar bodies are not easily brought into contact with each other, lithium ions in the electrolytic solution can easily move. Thus, a secondary battery excellent in charging and discharging at high rate and in charging at a low temperature can be achieved.

Hereinafter, a method of manufacturing a columnar body of a negative electrode for a non-aqueous electrolyte secondary battery in accordance with the first exemplary embodiment of the present invention is described with reference to FIG. 4.

Figure 4:
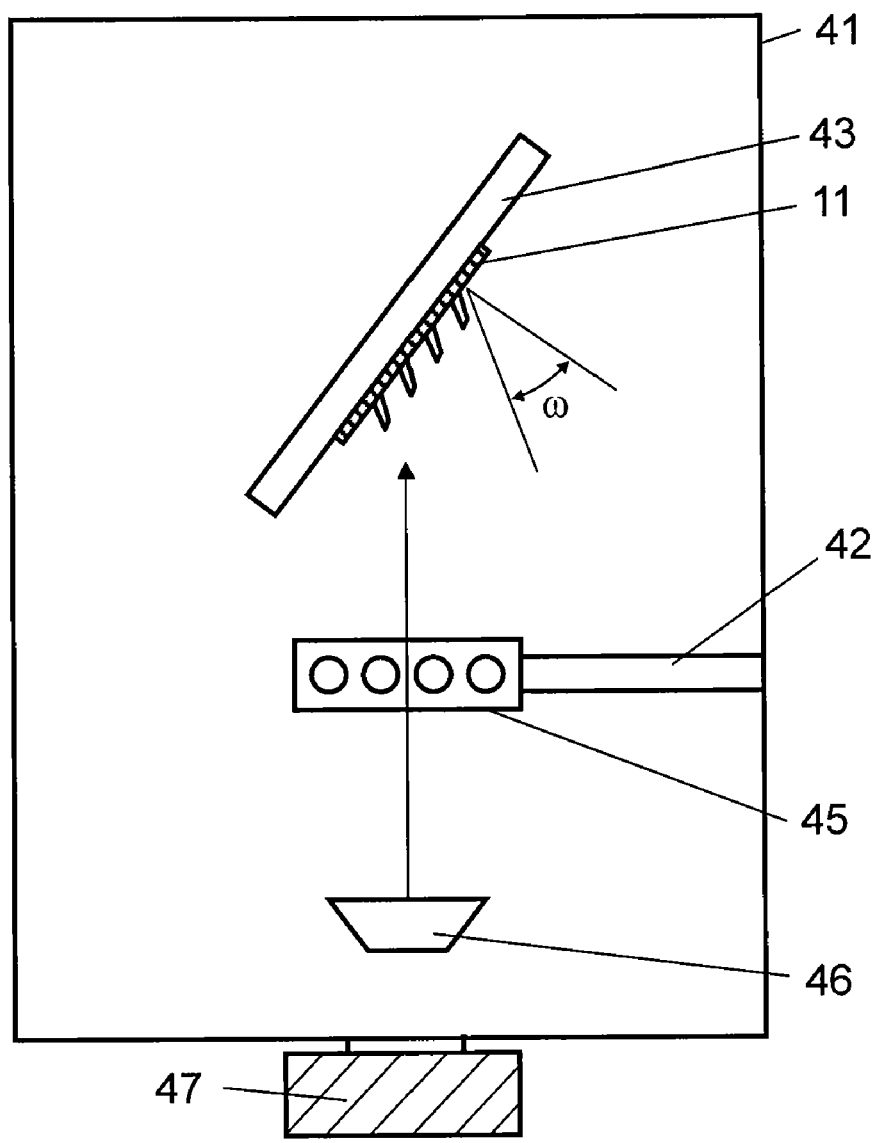
FIG. 4 is a schematic view illustrating a manufacturing apparatus for forming a columnar body of a negative electrode for a non-aqueous electrolyte secondary battery in accordance with the first exemplary embodiment of the present invention.

FIG. 4 is a schematic view illustrating a manufacturing apparatus for producing a columnar body of a negative electrode for a non-aqueous electrolyte secondary battery in accordance with the first exemplary embodiment of the present invention. Hereinafter, an active material made of SiO$_x$ is described as an example of the columnar body.

As shown in FIG. 4, manufacturing apparatus 40 for forming a columnar body includes an electron beam (not shown) as a heating means; gas introducing pipe 42 for introducing oxygen gas into vacuum chamber 41; and fixing stand 43 for fixing a current collector. The inside pressure of manufacturing apparatus 40 is reduced by using vacuum pump 47. Gas introducing pipe 42 has nozzle 45 for releasing oxygen gas into vacuum chamber 41. Fixing stand 43 for fixing a current collector is disposed above nozzle 45. Furthermore, vapor deposition source 46 to be deposited on the surface of the current collector so as to form a columnar body is disposed in the vertical lower side of fixing stand 43. In manufacturing apparatus 40, with an angle of fixing stand 43, the position relation between the current collector and vapor deposition source 46 can be changed. That is to say, the obliquely rising direction of the columnar body is controlled by changing angle ω made by the normal line direction and the horizontal direction on the surface of the current collector.

Note here that an example, in which a columnar body is produced on one surface of a current collector by using the manufacturing apparatus, is shown. Actually, in general apparatus configuration, a columnar body is produced on both surfaces of the conductive body.

Firstly, a 30 μm-thick band-shaped electrolytic copper foil, on the surface of which concave portion 12, first convex portion 13a and second convex portion 13b are formed by a plating method, is prepared. At this time, first convex portion 13a has, for example, a rhombus-shaped columnar structure having a major axis of 20 μm, a minor axis of 10 μm, and height of 10 μm. First convex portions 13a are formed at the interval of neighboring first convex portions 13a of 30 μm. Similarly, second convex portion 13b has, for example, a rhombus-shaped columnar structure having a major axis of 20 μm, a minor axis of 10 μm, and height of 5 μm. Second convex portions 13b are formed at the interval between neighboring second convex portions 13b of 30 μm. Furthermore, first convex portions 13a and second convex portions 13b are disposed at equal intervals. Then, current collector 11 is installed on fixing stand 43 shown in FIG. 4.

Next, fixing stand 43 is disposed with respect to vapor deposition source 46, at an angle of ω (for example, 55°) in the normal line direction of current collector 11. An active material such as Si (scrap silicon with a purity of purity 99.999%) is heated by an electron beam so as to be evaporated, and then allowed to enter first convex portion 13a and second convex portion 13b of current collector 11 from the direction shown by an arrow in FIG. 4. At the same time, oxygen (O$_2$) gas is introduced through gas introducing pipe 42, and supplied from nozzle 45 to current collector 11. At this time, the inside of vacuum chamber 41 is made to be, for example, an oxygen atmosphere with a pressure of 10$^{-3}$ Pa. Thus, an active material of SiO$_x$ obtained by combining Si and oxygen is formed at an angle of θ (≠ω) on first convex portion 13a and second convex portion 13b of current collector 11 provided on fixing stand 43 at an angle of ω.

As mentioned above, negative electrode 1 is produced, in which columnar bodies 15 having, for example, a height of 15 μm, are formed in such a manner as to rise obliquely on first convex portion 13a and second convex portion 13b of current collector 11.

Furthermore, in the above-mentioned manufacturing apparatus, an example in which a columnar body is produced on a current collector having a predetermined size is described. However, the apparatus is not necessarily limited to this configuration and various kinds of apparatus configurations are possible. For example, a roll-state current collector is disposed between a send-out roll and a wind-up roll and a film-formation roll is disposed therebetween, so that a columnar body may be formed while a current collector is arrowed to move in one direction. Furthermore, a columnar body is formed on one side of the current collector, followed by inversing the current collector so that the columnar body may be formed on the other surface of the current collector. Thus, negative electrodes can be produced with high productivity.

Second Exemplary Embodiment

Hereinafter, a negative electrode for a non-aqueous electrolyte secondary battery in accordance with a second exemplary embodiment of the present invention is described with reference to FIGS. 5A and 5B.

Figure 5A:
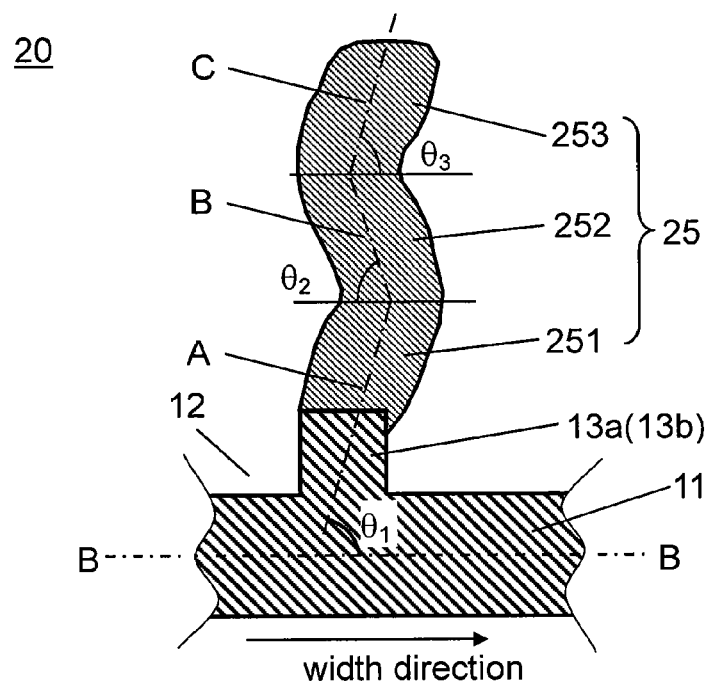
FIG. 5A is a partial schematic sectional view showing a structure of a negative electrode in accordance with a second exemplary embodiment of the present invention.
Figure 5B:
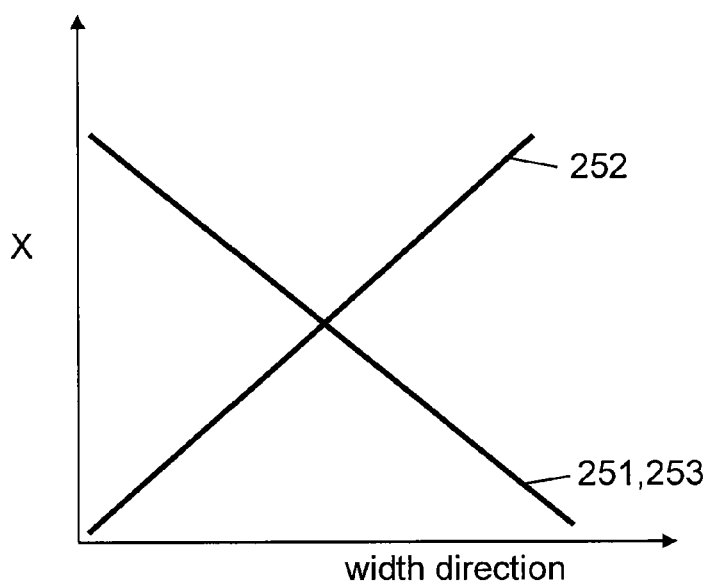
FIG. 5B is a graph schematically illustrating a change of a value of x in the width direction in which an active material rises obliquely in accordance with the second exemplary embodiment.

FIG. 5A is a partial schematic sectional view showing a structure of a negative electrode in accordance with the second exemplary embodiment of the present invention. FIG. 5B is a graph schematically illustrating a change of a value of x in the width direction in which an active material rises obliquely in accordance with the second exemplary embodiment. Herein, the negative electrode in accordance with the second exemplary embodiment of the present invention is different from that of the first exemplary embodiment in that a columnar body includes n stages (n=3) of columnar body portions and that the content ratio of elements constituting each columnar body portion is changed in the width direction in which the current collector rises obliquely.

That is to say, as shown in FIG. 5A, similar to the first exemplary embodiment, concave portion 12, higher first convex portion 13a and lower second convex portion 13b are provided on at least the upper surface of current collector 11 made of a conductive metal material such as copper foil. Then, on the upper part of first convex portion 13a and second convex portion 13b, an active material expressed by $SiO_x$ constituting negative electrode 1 is formed in a form of obliquely rising columnar body 25 by an oblique vapor deposition method using, for example, a sputtering method or a vacuum evaporation method. At this time, columnar body 25 includes a plurality of columnar body portions in which the columnar body portions in the odd-numbered stages and those in the even-numbered stages obliquely rise in different directions from each other. Columnar bodies 25 are provided on higher first convex portion 13a and lower second convex portion 13b but the configurations of the columnar bodies are the same, which is the point of the present invention. Therefore, columnar body 25 formed on first convex portion 13a is shown in the drawing and described as an example. That is to say, the same is true in columnar body 25 formed on second convex portion 13b.

Hereinafter, columnar body 25 in which n stages (n=3) of columnar body portions 251, 252, and 253 are laminated is specifically described as an example. However, the columnar body 25 is not necessarily limited to this example as long as n≧2 is satisfied.

Firstly, first columnar body portion 251 of columnar body 25 is formed on at least first convex portion 13a and second convex portion 13b of current collector 11 such that center line (A) in the obliquely rising direction of first columnar body portion 251 and center line (B-B) in the thickness (planer) direction of current collector 11 make a crossing angle (hereinafter, referred to as an "obliquely rising angle") $\theta_1$. Then, second columnar body portion 252 of columnar body 25 is formed on first columnar body portion 251 such that center line (B) in the rising direction and center line (B-B) in the thickness direction of current collector 11 make obliquely rising angle $\theta_2$. Furthermore, third columnar body portion 253 of columnar body 25 is formed on second columnar body portion 252 such that center line (C) in the rising direction and center line (B-B) in the thickness direction of current collector 11 make obliquely rising angle $\theta_3$. Note here that obliquely rising angles $\theta_1$, $\theta_2$ and $\theta_3$ may be the same angle or different angles as long as the adjacent columnar bodies 25 are not brought into contact with each other. At this time, columnar body 25 is formed such that the columnar body portions in the odd-numbered stages and those in the even-numbered stages obliquely rise in different directions from each other.

Columnar body 25 formed in, for example, a zigzag shape in n stages (n=3) in such a manner as to rise obliquely on first convex portion 13a and second convex portion 13b of current collector 11 expands in volume when the non-aqueous electrolyte secondary battery absorbs lithium ions at the time of charging. Furthermore, columnar body 25 contracts in volume at the time of discharging, because lithium ions are released. Thus, for example, when the height of columnar body 25 in the normal line direction of current collector 11 is equal, by forming columnar body 25 in n stages, the volume of each columnar body can be increased. As a result, a larger amount of lithium ions can be absorbed and released, so that the battery capacity can be further improved. Furthermore, stress, which is generated in the connection portion between the columnar body and the convex portion of the current collector at contact with the positive electrode mixture layer, can be distributed and absorbed in each bending portion of the n-stage configuration as compared with one-stage columnar body. Consequently, a non-aqueous electrolyte secondary battery in which exfoliation and breakage do not easily occur in the connection portion and which has an excellent reliability can be achieved.

Hereinafter, an operation at the time of charging and discharging of the secondary battery including a negative electrode for a non-aqueous electrolyte secondary battery in accordance with the second exemplary embodiment of the present invention is described with reference to FIGS. 6A and 6B.

Figure 6A:
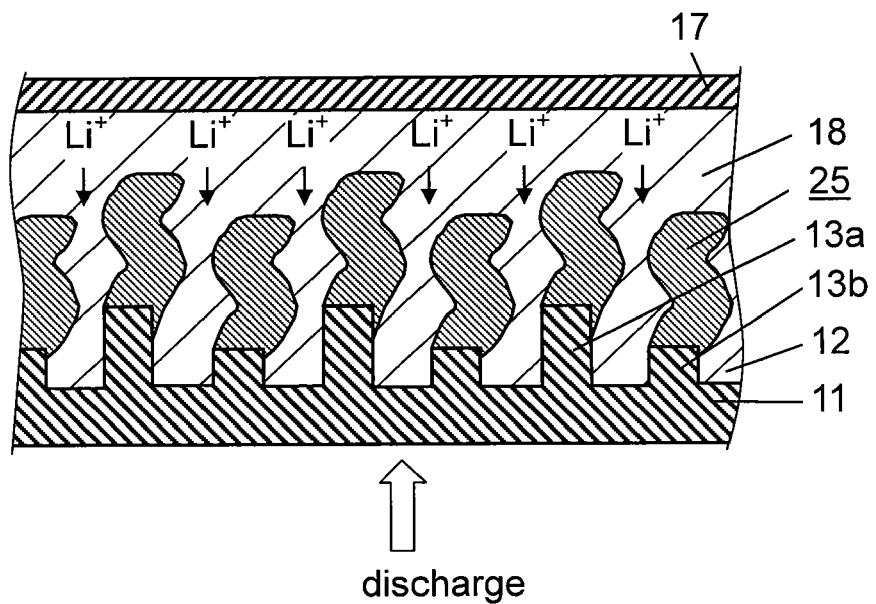
FIG. 6A is a partial schematic sectional view showing a state of a non-aqueous electrolyte secondary battery before charging in accordance with the second exemplary embodiment of the present invention.

FIG. 6A is a partial schematic sectional view showing a state of a non-aqueous electrolyte secondary battery before charging in accordance with the second exemplary embodiment of the present invention. FIG. 6B is a partial schematic sectional view showing a state of a non-aqueous electrolyte secondary battery after charging in accordance with the second exemplary embodiment.

Columnar body 25, which includes n stages (n=3) of columnar body portions and is formed in such a manner as to rise obliquely on first convex portion 13a and second convex portion 13b of current collector 11, expands in volume when lithium ions are absorbed at the time of charging of the non-aqueous electrolyte secondary battery. At this time, along with the expansion of the volume, obliquely rising angles $\theta_1$, $\theta_2$, and $\theta_3$ of columnar body portions 251, 252, and 253 of columnar body 25 are increased. This operation is described in detail with reference to FIGS. 7A and 7B illustrating the operation. As a result, columnar body 25 is deformed such that it rises upright as shown in, for example, in FIG. 6B. On the contrary, at the time of discharging, as shown in FIG. 6A, with release of lithium ions, the volume contracts and obliquely rising angles $\theta_1$, $\theta_2$, and $\theta_3$ are reduced, and columnar body 25 becomes the initial state.

Herein, as shown in FIG. 6A, when charging starts, columnar body 25 including n stages (n=3) of columnar body portions 251, 252 and 253 is formed in such a manner as to obliquely rise on first convex portion 13a and second convex portion 13b of current collector 11. As a result, when columnar body 25 is seen in projection from positive electrode 17, concave portion 12 of current collector 11 is partially shielded by columnar body 15. Therefore, lithium ions released from positive electrode 17 at the time of charging are prevented from directly reaching concave portion 12 of current collector 11 by columnar body 25 of the negative electrode, and almost all of lithium ions are absorbed by columnar body 25. Consequently, the deposition of lithium metal can be suppressed. Then, according to absorption of lithium ions, the obliquely rising angles of columnar body portions 251, 252 and 253 are increased. Finally, columnar body 15 becomes a substantially upright state with respect to current collector 11. Note here that columnar body 25 is not necessarily upright and the shape may be formed in a zigzag shape with the obliquely rising angle of not larger than 90° depending upon the designing factors such as the number of the stages or the obliquely rising angle of columnar body portions. However, it is preferable that the obliquely rising angle is designed to be 90°.

Figure 6B:
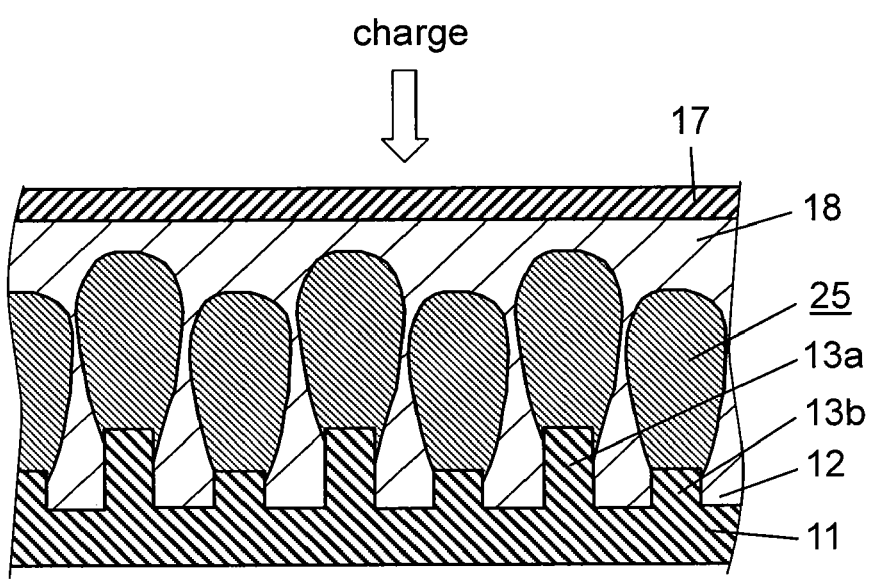
FIG. 6B is a partial schematic sectional view showing a state of a non-aqueous electrolyte secondary battery after charging in accordance with the second exemplary embodiment.
Figure 7A:
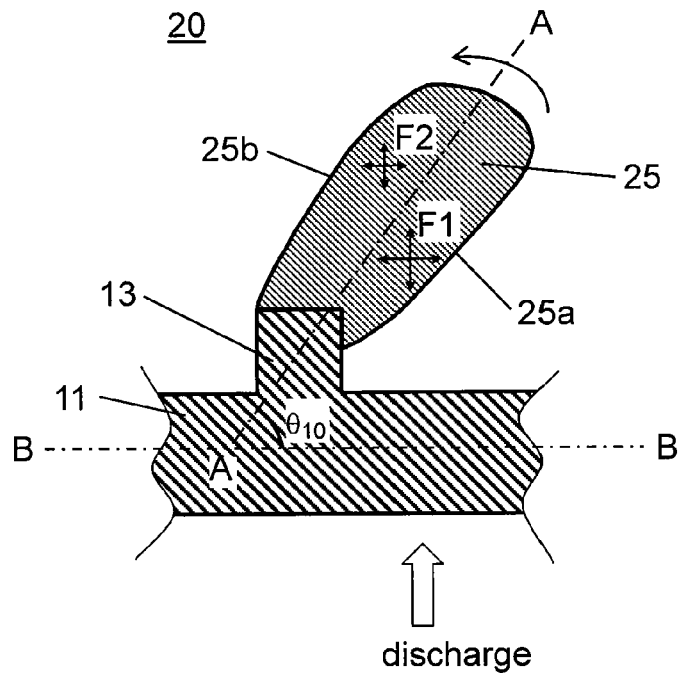
FIG. 7A is a partial schematic sectional view showing a state of a columnar body of a negative electrode before charging in accordance with the second exemplary embodiment of the present invention.
Figure 7B:
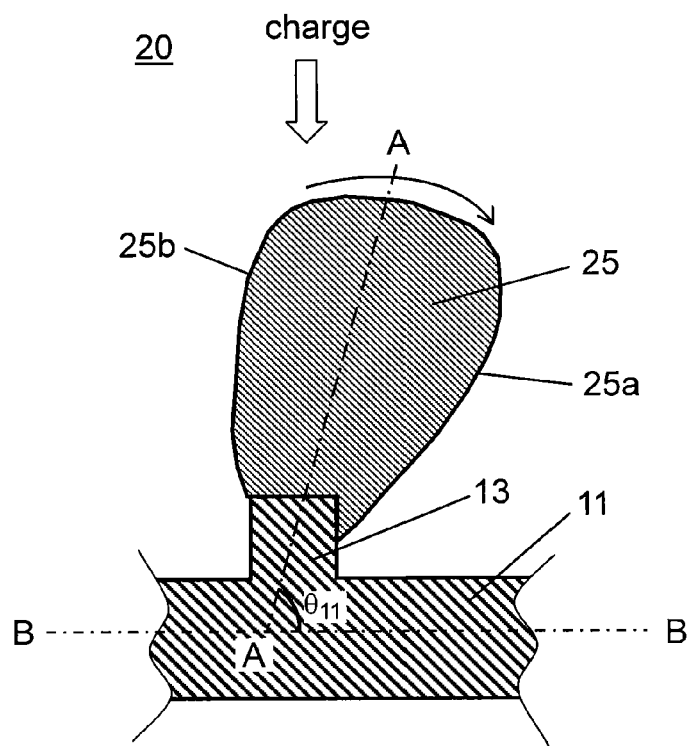
FIG. 7B is a partial schematic sectional view showing a state of a columnar body of a negative electrode after charging in accordance with the second exemplary embodiment.

Furthermore, as shown in FIG. 6B, when a completely charged battery is discharged, columnar body 25 including columnar body portions, which have been expanded by changing, becomes a state in which it is upright with respect to current collector 11. Therefore, electrolytic solution 18 that is present between neighboring columnar bodies 25 can easily move in a position between columnar bodies 25 as shown by arrows in the drawing. Since electrolytic solution 18 that is present between columnar bodies 25 can easily circulate through gaps between columnar bodies 25, the movement of lithium ions cannot be prevented. In addition, since columnar body 25 is in a rising state, as compared with the obliquely rising state at the initial time of charging, a moving length of electrolytic solution 18 is shortened. This is because lithium ions can move straightly. As a result, characteristic of high-rate discharge and low-temperature discharge can be improved significantly.

Hereinafter, the mechanism in which the obliquely rising angles of columnar body 25 are reversibly changed due to absorption and release of lithium ions is described with reference to FIGS. 7A and 7B.

In the present invention, the columnar body is formed in n stages (n≧2). However, for easy description, a columnar body including one columnar body portion formed on at least a first convex portion of a current collector is described in FIGS. 7A and 7B. N-staged configuration can function by the same mechanism.

FIG. 7A is a partial schematic sectional view showing a state of a columnar body of a negative electrode before charging in accordance with the second exemplary embodiment of the present invention. FIG. 7B is a partial schematic sectional view showing a state of a columnar body of a negative electrode after charging in accordance with the second exemplary embodiment.

In columnar body 25 shown in FIGS. 7A and 7B, the content rate of element of an active material made of $SiO_x$ is changed such that the value of x is continuously increased from lower side 25a of columnar body 25 in which center line (A-A) of columnar body 25 and center line (B-B) of current collector 11 make an acute angle to upper side 25b in which an obtuse angle of is made. Then, in general, in the active material including $SiO_x$, as the value of x increase from 0 to 2, the expansion amount due to the absorption of lithium ions is reduced.

That is to say, as shown in FIG. 7A, expansion stress generated when lithium ions are absorbed at the time of charging is continuously reduced from expansion stress F1 in lower side 25a of columnar body 25 to expansion stress F2 in upper side 25b of columnar body 25. As a result, obliquely rising angle $\theta$ made by center line (A-A) of columnar body 25 and center line (B-B) of current collector 11 is changed from $\theta_{10}$ to $\theta_{11}$, and columnar body 25 rises up in the direction shown by an arrow in FIG. 7A. On the contrary, at the time of discharging, the expansion stress generated by release of lithium ions is reduced. As a result, obliquely rising angle $\theta$ of columnar body 25 is changed from $\theta_{11}$ to $\theta_{10}$ and columnar body 25 changes its shape in the direction shown by an arrow in FIG. 7B.

As mentioned above, in columnar body 25, the obliquely rising angle is reversibly changed due to the absorption and release of lithium ions.

According to this exemplary embodiment, by forming a columnar body on convex portions having different height, the same effect as in the first exemplary embodiment can be obtained and the following effect can be added.

That is to say, since at least n stages (n=2) of columnar body portions are laminated so as to form a columnar body, when the amount of the active material capable of absorbing and releasing lithium ions is equalized, the height (thickness) of the columnar body portion in each stage can be reduced. As a result, as compared with the case in which one columnar body is used, the expansion amount at the tip of the columnar body portion of each stage is reduced. Therefore, since a gap by the interval between the neighboring columnar bodies does not easily become narrow due to the expansion of the columnar body, the columnar bodies are not easily brought into contact with each other. Consequently, the tolerance of the columnar body with respect to expansion can be significantly increased, so that a larger amount of lithium ions can be absorbed and the battery capacity can be improved.

Furthermore, with the columnar body including n stages of columnar body portions, a gap between the neighboring columnar bodies can be maintained to be large even if the columnar bodies are expanded. Then, since neighboring columnar bodies are not brought into contact with each other, generation of stress by the contact of current collectors can be prevented, and wrinkles and exfoliation caused by the stress can be prevented in advance. Therefore, a non-aqueous electrolyte secondary battery that is excellent in the charge and discharge cycle characteristics can be achieved.

As mentioned above, according to this embodiment, it is possible to achieve a non-aqueous electrolyte secondary battery excellent in the capacity maintenance rate, high-rate characteristic and low-temperature characteristic while the capacity can be further increased.

Hereinafter, a method of manufacturing a columnar body of a negative electrode for a non-aqueous electrolyte secondary battery in accordance with the second exemplary embodiment of the present invention is described with reference to FIGS. 8A to 8D and FIG. 9.

FIGS. 8A-8D are partial schematic sectional views illustrating a method of forming a columnar body including n stages of columnar body portions in a negative electrode for a non-aqueous electrolyte secondary battery in accordance with the second exemplary embodiment of the present invention. FIG. 9 is a schematic view illustrating a manufacturing apparatus thereof. Hereinafter, a columnar body including n stages (n=3) of columnar body portions is described as an example. Furthermore, FIGS. 8A to 8D show sectional views of FIG. 2C or FIG. 2D in order to illustrate the state in which each columnar body portion is formed in such a manner as to rise obliquely. Therefore, only the first convex portion or the second convex portion is shown. However, the formed columnar body portion is formed by the same method as in the first exemplary embodiment. Furthermore, the manufacturing apparatus shown in FIG. 9 is basically the same as that shown in FIG. 4 except that the manufacturing apparatus shown in FIG. 9 has a configuration in which an obliquely rising angle of the columnar body portion can be changed. Since the other configurations are the same, the description thereof is omitted herein.

Figure 8A:
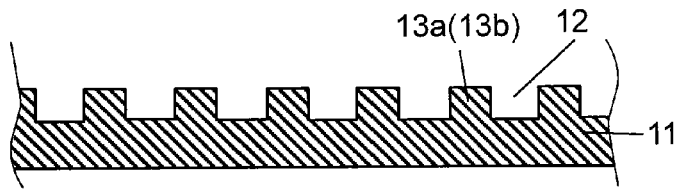
FIG. 8A is a partial schematic sectional view illustrating a method of forming a columnar body including n stages of columnar body portions of a negative electrode for a non-aqueous electrolyte secondary battery in accordance with the second exemplary embodiment of the present invention.
Figure 9:
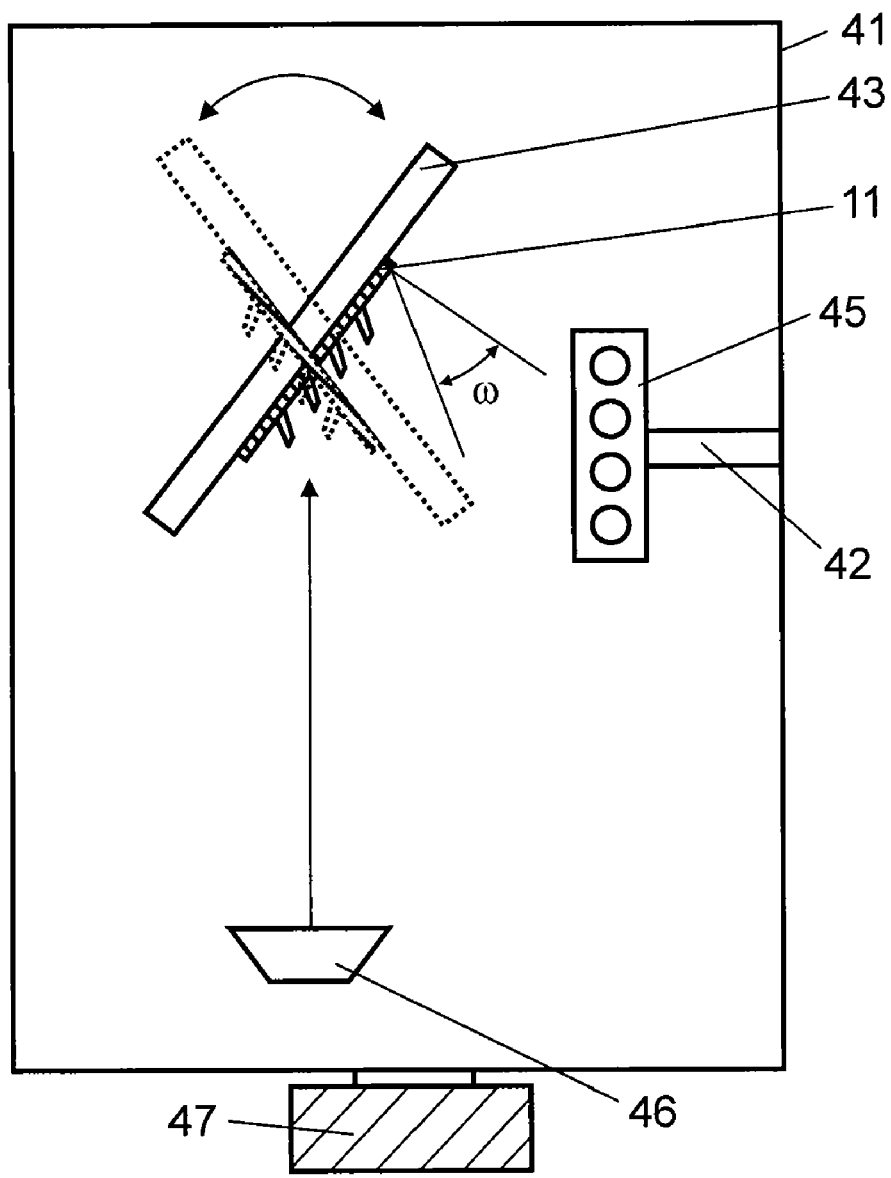
FIG. 9 is a schematic view illustrating a manufacturing apparatus for forming a columnar body of a negative electrode for a non-aqueous electrolyte secondary battery in accordance with the second exemplary embodiment of the present invention.

Firstly, as shown in FIGS. 8A and 9, a 30 μm-thick band-shaped electrolytic copper foil on the surface of which concave portion 12, first convex portion 13a and second convex portion 13b are formed by a plating method is prepared. At this time, first convex portion 13a has, for example, a rhombus-shaped columnar structure having a major axis of 20 μm, a minor axis of 10 μm, and height of 10 μm. First convex portions 13a are formed at the interval between neighboring first convex portions of 30 μm. Similarly, second convex portion 13b has, for example, a rhombus-shaped columnar structure having a major axis of 20 μm, a minor axis of 10 μm, and height of 5 μm. Second convex portions 13b are formed at the interval between neighboring second convex portions of 30 μm. Furthermore, first convex portions 13a and second convex portions 13b are disposed at equal intervals. Then, current collector 11 is installed on fixing stand 43 shown in FIG. 9.

Figure 8B:
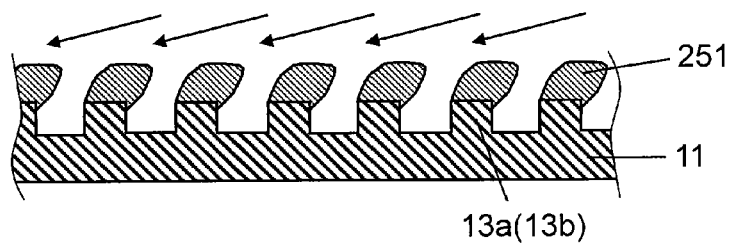
FIG. 8B is a partial schematic sectional view illustrating a method of forming a columnar body including n stages of columnar body portions of a negative electrode for a non-aqueous electrolyte secondary battery in accordance with the second exemplary embodiment of the present invention.

Next, as shown in FIGS. 8B and 9, fixing stand 43 is disposed with respect to vapor deposition source 46 at an angle of ω (for example, 55°) in the normal line direction of current collector 11. An active material such as Si (scrap silicon with a purity of 99.999%) is heated by an electron beam to be evaporated, and then allowed to enter first convex portion 13a and second convex portion 13b of current collector 11 from the direction shown by an arrow in FIG. 8B. At the same time, oxygen ($O_2$) gas is introduced through gas introducing pipe 42, and supplied from nozzle 45 to current collector 11. At this time, the inside of vacuum chamber 41 is made to be, for example, an oxygen atmosphere with a pressure of $10^{-3}$ Pa. Thus, first columnar portion 251 having a thickness of 10 μm in the obliquely rising direction is formed on first convex portion 13a and second convex portion 13b of current collector 11 at an angle of $\theta_1$. On fixing stand 43, an active material of $SiO_x$ obtained by combining Si and oxygen is disposed at an angle of ω. At this time, first columnar body 251 is formed in a state in which the value of x of $SiO_x$ to be formed as a film sequentially changes in the width direction of current collector 11. For example, in FIG. 8B, the value of x in the right side in the drawing is small and the value of x in the left side is large.

Figure 8C:
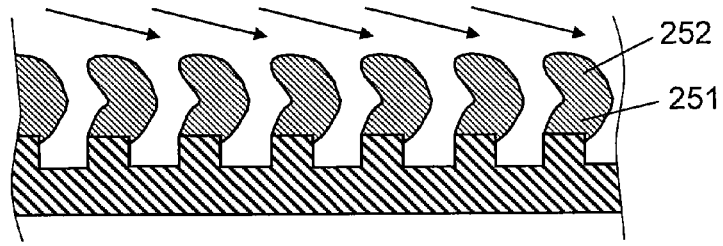
FIG. 8C is a partial schematic sectional view illustrating a method of forming a columnar body including n stages of columnar body portions of a negative electrode for a non-aqueous electrolyte secondary battery in accordance with the second exemplary embodiment of the present invention.

Next, as shown in FIGS. 8C and 9, current collector 11, in which first columnar body portion 251 is formed on first convex portion 13a and second convex portion 13b, is disposed on a position at an angle (180-ω) (for example, 125°) with respect to the normal line direction of current collector 11 by rotating fixing stand 43 as shown by a broken line in the drawing. Then, from vapor deposition source 46, for example, an active material such as Si (scrap silicon with a purity of 99.999%) is allowed to evaporate and enter columnar body portion 251 of current collector 11 from the direction shown by an arrow in FIG. 8C. At the same time, oxygen ($O_2$) gas is introduced through gas introducing pipe 42, and supplied from nozzle 45 to current collector 11. Thus, an active material of $SiO_x$ obtained by combining Si and oxygen is formed on columnar body portion 251 at an angle of $\theta_2$ and obliquely rising second columnar body portion 252 having a thickness of 10 μm in the obliquely rising direction is formed on at least first convex portion 13a and second convex portion 13b of current collector 11. At this time, second columnar body 252 is formed in a state in which the value of x of SiOx to be formed as a film is sequentially changed in the width direction of current collector 11. For example, in second columnar body portion 252 in FIG. 8C, the value of x in the left side of the drawing is small and the value of x in the right side of the drawing is large. Thus, first columnar body portion 251 and second columnar body portion 252 are formed such that the direction in which the value of x is changed is opposite to each other in the width direction of current collector 11, and the obliquely rising angle and the obliquely rising direction are different from each other.

Figure 8D:
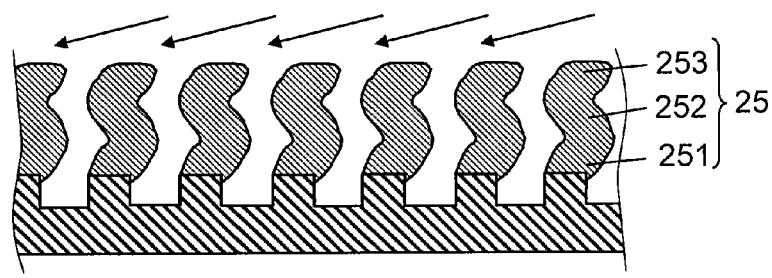
FIG. 8D is a partial schematic sectional view illustrating a method of forming a columnar body including n stages of columnar body portions of a negative electrode for a non-aqueous electrolyte secondary battery in accordance with the second exemplary embodiment of the present invention.

Next, as shown in FIGS. 8D and 9, current collector 11 having second columnar body portion 252 on first convex portion 13a and second convex portion 13b is disposed on the position at an angle (ω) (for example, 55°) in the normal line direction of current collector 11 by rotating fixing stand 43 to the original position shown by a broken line in the drawing. Then, by the same method as described in FIG. 8B, third columnar body portion 253 having a thickness in the obliquely rising direction of 10 μm is formed at an angle of θ3 on second columnar body portion 252 at least on first convex portion 13a and second convex portion 13b of current collector 11. At this time, third columnar body portion 253 is formed in a state in which the value of x of $SiO_x$ to be formed as a film sequentially changes in the width direction of current collector 11. For example, in third columnar body portion 253 shown in FIG. 8D, the value of x in the right side of the drawing is small and the value of x in the left side of the drawing is large. Thus, second columnar body portion 252 and third columnar body portion 253 are formed such that the direction in which the value of x is changed is opposite to each other and the obliquely rising angle and obliquely rising direction are different from each other.

From the above mention, negative electrode 20 having columnar body 25 including first columnar body portion 251, second columnar body portion 252 and third columnar body portion 253 on first convex portion 13a and second convex portion 13b of current collector 11 is formed.

In the above description, an example of a columnar body including n stages (n=3) of columnar body portions is described. A columnar body is not necessarily limited to this example. For example, by repeating the processes shown in FIGS. 8B and 8C, a columnar body including arbitrary n stages (n≧2) of columnar body portions can be formed.

Furthermore, in the above-mentioned manufacturing apparatus, an example in which a columnar body is produced on a current collector having a predetermined size is described. However, the apparatus is not necessarily limited to this configuration and various kinds of apparatus configurations are possible. For example, a roll-state current collector is disposed between a send-out roll and a wind-up roll and a plurality of film-formation rolls are disposed in series, so that n-stage columnar body may be formed while a current collector is arrowed to move in one direction. Furthermore, a columnar body is formed on one side of the current collector, followed by inversing the current collector so that the columnar body may be formed on the other surface of the current collector. Thus, negative electrodes can be produced with high productivity.

Furthermore, by applying the second exemplary embodiment of the present invention to the first exemplary embodiment, a columnar body may have a configuration in which the ratio of elements contained in the direction in which the columnar body rises obliquely is the same and which includes n stages (n≧2) of columnar body portions. Furthermore, a columnar body may have a configuration in which the ratio of elements contained in the direction in which the columnar body rises obliquely is changed and which includes n stage (n=1) of columnar body portion.

Figure 10A:
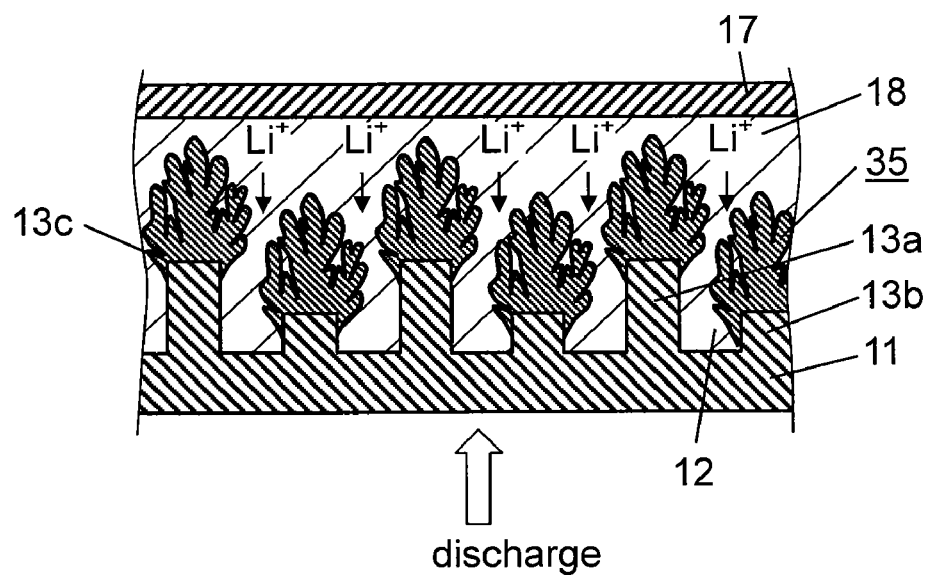
FIG. 10A is a partial schematic sectional view showing a state of another example of an electrode for a non-aqueous electrolyte secondary battery before charging in accordance with each exemplary embodiment of the present invention.
Figure 10B:
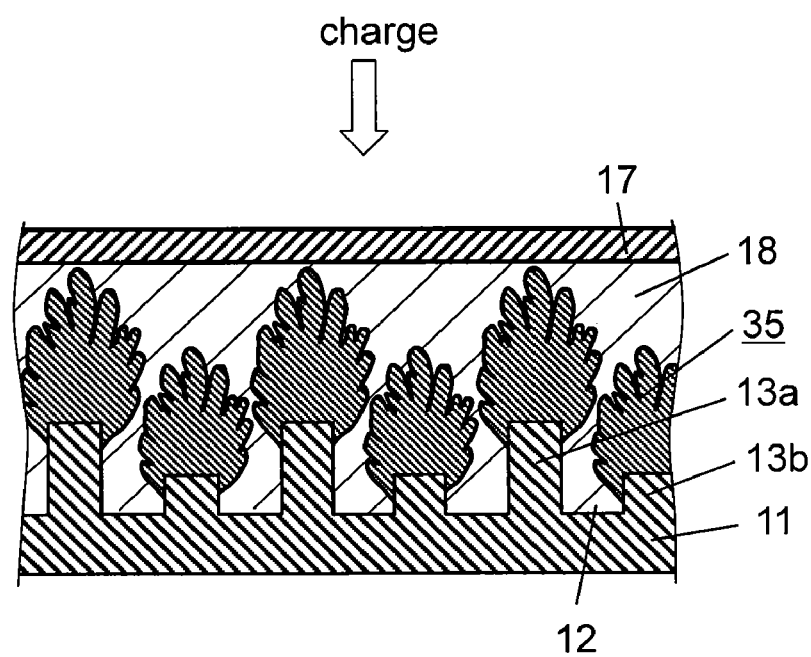
FIG. 10B is a partial schematic sectional view showing a state thereof after charging in accordance with the exemplary embodiment.

The above-mentioned exemplary embodiments describe an example in which columnar bodies are formed on the first convex portion and the second convex portion in a state in which columnar bodies rise obliquely. However, the columnar body is not necessarily limited to this example. For example, as shown in FIGS. 10A and 10B, by using a thermal plasma method or an RF plasma method, plasma-state clusters of active material may be deposited on the first convex portion and the second convex portion in the normal line of the current collector, and may be formed as columnar body 35 radially from edge portion 13c of at least first convex portion 13a and second convex portion 13b. Thus, with columnar body 35 connected to all the surfaces of first convex portion 13a and second convex portion 13b, attaching strength of the connection interface is improved. Consequently, a negative electrode excellent in reliability with respect to stress concentration due to expansion and contraction of the columnar body is formed. As a result, a secondary battery that achieves the charge and discharge cycle characteristic and high capacity is produced.

Furthermore, this exemplary embodiment describes a negative electrode for a non-aqueous electrolyte secondary battery as an example of an electrode for an electrochemical element. However, the electrode is not necessarily limited to this example. For example, when an electrode for a lithium ion capacitor is applied to a capacitative element, the same effect can be obtained.

Hereinafter, the present invention is described in more detail with reference to Examples. Note here that the present invention is not particularly limited to the below-mentioned Examples and materials to be used and the like can be changed as long as they do not change the summary of the present invention.

Example 1

A columnar body of a negative electrode is produced by using a manufacturing apparatus shown in FIG. 4. Firstly, as shown in FIG. 2A, on a current collector, first convex portions each having a rhombus-shaped columnar structure having a major axis of 20 µm, a minor axis of 10 µm, and height of 10 µm are formed by using a plating method. The first convex portions are formed at the interval between the first convex portions of 30 µm. Similarly, the second convex portions each having a rhombus-shaped columnar structure having a major axis of 20 µm, a minor axis of 10 µm, and height of 5 µm are formed. The second convex portions are formed at the interval between the second convex portions of 30 µm. Then, a 30 µm-thick band-shaped electrolytic copper foil, on which the first convex portions and the second convex portions are formed at equal intervals, is used.

Then, Si is used as an active material of the negative electrode. By using a vapor deposition unit (a unit including a vapor deposition source, a crucible and an electron beam generator), an oxygen gas with a purity of 99.7% is introduced from nozzle 45 into a vacuum chamber. Thus, n stage (n=1) of columnar body made of SiOx is produced. At this time, the inside of the vacuum chamber is made to be an oxygen atmosphere with a pressure of $10^{-3}$ Pa. Furthermore, at the time of vapor deposition, an electron beam generated by an electron beam generator is polarized by a polarization yoke, and the vapor deposition source is irradiated with the electron beam. As the vapor deposition source, for example, a scrap material (scrap silicon with a purity of 99.999%) generated when semiconductor wafers are formed is used.

Furthermore, the columnar body is formed at a film formation speed of about 8 nm/s such that angle ω becomes 60° by adjusting the angle of a fixing stand. Thus, a columnar body having a height of 15 µm is formed.

When an angle of the columnar body with respect to a center line of the current collector in the negative electrode is evaluated by sectional observation with the use of scanning electron microscope (S-4700, Hitachi), the obliquely rising angle of the columnar body is about 46°. At this time, the thickness (height) of the formed columnar body in the normal line direction is 15 µm.

Furthermore, when distribution of oxygen is examined by the measurement of line distribution in the cross sectional direction of the columnar body constituting the negative electrode by using EPMA, SiOx with substantially uniform composition is observed. The value of x at this time is 0.4.

From the above mention, a negative electrode including a columnar body on a first convex portion and a second convex portion of a current collector is formed.

Thereafter, 7 µm of Li metal is vapor-deposited on the surface of the negative electrode by a vacuum evaporation method. Furthermore, on the inner peripheral side of the negative electrode, an exposed portion of copper (Cu) foil that does not face the positive electrode is provided and a negative electrode lead made of Cu is welded.

Next, a positive electrode including a positive electrode active material capable of absorbing and releasing lithium ions is produced by the following method.

Firstly, 93 parts by weight of $LiNi0_{0.85}Co_{0.15}O_2$ powder as a positive electrode active material and 4 parts by weight of acetylene black as a conductive agent are mixed. N-methyl-2-pyrrolidone (NMP) solution including polyvinylidene fluoride (PVDF) (#1320, Kureha Kagaku) as a binder is mixed to the powder so that the weight of PVDF becomes 3 parts by weight. An appropriate amount of NMP is added to the mixture so as to prepare a positive electrode mixture paste. The positive electrode mixture paste is coated on both surfaces of a positive electrode current collector (thickness: 15 µm) made of an aluminum (Al) foil by a doctor blade method, and pressure-rolled so that a density of the positive electrode mixture layer becomes 3.6 g/cc and the thickness becomes 140 µm, and sufficiently dried at 85° C., followed by cutting thereof. Thus, a positive electrode is produced. On the inner peripheral side of the positive electrode, an exposed portion is provided on Al foil that does not face the negative electrode and a positive electrode lead made of Al is welded.

The negative electrode and positive electrode produced as mentioned above are laminated on each other via a 25 µm-thick separator made of porous polypropylene so as to form an electrode group having a size of 40 mm ☐ 30 mm. The electrode group is impregnated with an electrolytic solution that is a mixed solution of $LiPF_6$ in ethylene carbonate/diethyl carbonate and accommodated in an external case (material:

aluminum). Then, an opening of the external case is sealed. Thus, a laminated type battery is produced. Note here that design capacity of the battery is made to be 40 mAh. This battery is defined as sample 1.

Example 2

A negative electrode is produced in the same manner as in Example 1 except that the height of a first convex portion is made to be 7.5 µm.

At this time, an obliquely rising angle of a columnar body is about 46° and the thickness (height) of the formed columnar body is 15 µm. When distribution of oxygen is examined by the measurement of line distribution in the cross sectional direction of the columnar body constituting the negative electrode by using EPMA, $SiO_x$ with substantially uniform composition is observed. The value of x at this time is 0.4.

A non-aqueous electrolyte secondary battery is produced by the similar method as in Example 1 except that the above-mentioned negative electrode is used. This battery is defined as sample 2.

Example 3

A negative electrode is produced in the same manner as in Example 1 except that the height of a first convex portion is made to be 15 µm.

At this time, an obliquely rising angle of a columnar body is about 46° and the thickness (height) of the formed columnar body is 15 µm. When distribution of oxygen is examined by the measurement of line distribution in the cross sectional direction of the columnar body constituting the negative electrode by using EPMA, $SiO_x$ with substantially uniform composition is observed. The value of x at this time is 0.4.

A non-aqueous electrolyte secondary battery is produced by the similar method as in Example 1 except that the above-mentioned negative electrode is used. This battery is defined as sample 3.

Example 4

Firstly, a current collector including a first convex portion and a second convex portion, which is the same as in Example 1, is used. Then, by the same method as in the second exemplary embodiment, a negative electrode is formed in the same manner as in Example 1 except that the height of each columnar body portion is made to be 5 µm. At this time, the columnar body of the negative electrode is produced by using a manufacturing apparatus shown in FIG. 9.

Note here that, an obliquely rising angle of a columnar body is about 46° and the thickness (height) of the formed columnar body is 15 µm.

Furthermore, the measurement by EPMA shows that the oxygen concentration (value of x) is continuously increased from the side of the obliquely rising angle θ to (180-θ) in the width direction of each columnar body portion. The direction in which the oxygen concentration (value of x) is increased in the first and third stages of the columnar body portions is opposite to that in the second and fourth stages of the columnar body portions. The value of x at this time is in the range from 0.1 to 2 and 0.4 on average.

A non-aqueous electrolyte secondary battery is produced by the similar method as in Example 1 except that the above-mentioned negative electrode is used. This battery is defined as sample 4.

Example 5

A columnar body of a negative electrode is produced by using an RF plasma film formation apparatus. At this time, similar to Example 1, a current collector including a first convex portion and a second convex portion is used.

Then, 80 at % Si powder and 20 at % $SiO_2$ powder are used as an active material of the negative electrode and a mixture gas of $Ar/H_2$ in the mixing ratio of 50 (liter/minute)/10 (liter/minute) as a carrier gas are supplied from an introduction port of the torch of the RF plasma formation apparatus. Next, the introduced active material and carrier gas are gasified in a plasma state by applying 30 kW of RF electric power to an RF coil. Furthermore, the active material gasified in a plasma state is injected toward the current collector positioned at 250 mm from an emission port of the torch so as to form a columnar body growing radially on the first convex portion and the second convex portion. These procedures are carried out at an internal pressure of a chamber of 26 kPa (about 0.26 atmospheric pressure). At this time, the thickness (height) of the columnar body is 15 µm with respect to the normal line direction.

When distribution of oxygen is examined by the measurement of line distribution in the cross sectional direction of the columnar body that constitutes the negative electrode by using EPMA, $SiO_x$ with substantially uniform composition is observed. The value of x at this time is 0.4.

A non-aqueous electrolyte secondary battery is produced by the similar method as in Example 1 except that the above-mentioned negative electrode is used. This battery is defined as sample 5.

Comparative Example 1

A negative electrode is produced in the same manner as in Example 1 except that a current collector, in which the height of the second convex portion 2 is equal to that of a first convex portion and the height is 10 µm, is used and one stage of columnar body is formed to the thickness (height) of 15 µm in the normal line direction.

When an angle of the columnar body with respect to a center line of the current collector in the negative electrode is evaluated by sectional observation with the use of scanning electron microscope (S-4700, Hitachi), the obliquely rising angle of the columnar body is about 46°. At this time, the thickness (height) of the formed columnar body in the normal line direction is 15 µm.

Furthermore, when distribution of oxygen is examined by the measurement of line distribution in the cross sectional direction of the columnar body that constitutes the negative electrode by using EPMA, $SiO_x$ with substantially uniform composition is formed. The value of x at this time is 0.4.

A non-aqueous electrolyte secondary battery is produced by the similar method as in Example 1 except that the above-mentioned negative electrode is used. This battery is defined as sample C1.

The non-aqueous electrolyte secondary batteries produced as mentioned above are evaluated as follows.

Firstly, the non-aqueous electrolyte secondary batteries are charged and discharged at a temperature of 25° C. in the following conditions.

At this time, at design capacity (40 mAh), the batteries are charged up to a battery voltage of 4.2 V at constant current of hour rate of 1.0 C (40 mA), and are charged at constant voltage of 4.2 V so as to attenuate the current value to current of hour rate of 0.05 C (2 mA). Then, the battery is in a rest for 30 minutes. Thereafter, the batteries are discharged at constant current value of hour rate of 0.2 C (8 mA) until the battery voltage is reduced to 2.0 V. The above-mentioned charge and discharge is defined as one cycle, and the discharge capacity in the third cycle is defined as the battery capacity.

Furthermore, the battery capacity is measured. In addition, the fourth charging is carried out, and then a state of the cross-section of the battery is observed in a non-destructive state by using X-ray CT system. In this way, deformation of the electrode by the initial charge and discharge is evaluated.

Furthermore, the non-aqueous electrolyte secondary batteries are charged and discharged repeatedly at a temperature of 25° C.

At this time, at design capacity (40 mAh), the batteries are charged up to a battery voltage of 4.2 V at constant current of hour rate of 1.0 C (40 mA), and are charged at constant voltage of 4.2 V until the charging current is reduced to the current value of hour rate of 0.05 C (2 mA). Then, the battery is in a rest for 30 minutes after charging. Thereafter, the batteries are discharged at constant current value of hour rate of 0.2 C (8 mA) until the battery voltage is reduced to 2.0 V. Then, the battery is in a rest for 30 minutes.

The above-mentioned charge and discharge is defined as one cycle, and the cycle is repeated 200 cycles. Then, the rate of the discharge capacity of the 200th cycle with respect to the first cycle is expressed by percentage. The value expressed by percentage is defined as the capacity maintenance rate (%). That is to say, it is shown that the charge and discharge cycle characteristic is more excellent as the capacity maintenance rate is nearer to 100.

Furthermore, the rate of the discharge capacity in discharging at high rate of 1.0 C (40 mA) to the discharge capacity in discharging at 0.2 C (8 mA) is expressed by the percentage. The value expressed by the percentage is defined as high-rate ratio (%).

Then, the above-mentioned capacity maintenance rate, charge and discharge efficiency, and high-rate ratio are observed at the tenth cycle and the 200th cycle.

Next, the battery that has been subjected to 200 cycles of discharging is disassembled so as to observe exfoliation and elimination of the columnar body from the current collector by visual observation and by observation using a scanning electron microscope (SEM). Thus, the state of the electrode after charge and discharge cycle is evaluated.

Hereinafter, parameters and evaluation results of samples 1 to 5 and sample C1 are shown in Table 1 and Table 2.

TABLE 1

|  | 1 (μm) | *2 (μm) | n (stage) | *3 (°) | *4 (μm) | *5 (μm) | *6 | *7 |
|---|---|---|---|---|---|---|---|---|
| Sample 1 | 10 | 5 | 1 | 46 | 15 | 15 | Not observed | 0.4 |
| Sample 2 | 7.5 | 5 | 1 | 46 | 15 | 15 | Not observed | 0.4 |
| Sample 3 | 15 | 5 | 1 | 46 | 15 | 15 | Not observed | 0.4 |
| Sample 4 | 10 | 5 | 3 | 46 | 5 | 15 | Not observed | 0.4 |
| Sample 5 | 10 | 5 | — | — | 15 | 15 | Not observed | 0.4 |
| Sample C1 | 10 | 10 | 1 | 46 | 15 | 15 | Observed | 0.4 |

*1: Height of first convex portion
*2: Height of second convex portion
*3: Obliquely rising angle
*4: Thickness of columnar body portion
*5: Thickness of columnar body
*6: Presence of deformation of electrode
*7: Average value of x in $SiO_x$

TABLE 2

|  | Number of cycles (cycles) | State of electrode Exfoliation of columnar body | State of electrode Deformation of current collector | High-rate ratio (%) | Capacity maintenance rate (%) |
|---|---|---|---|---|---|
| Sample 1 | 10 | — | — | 97 | 99 |
|  | 200 | Not observed | Not observed | 86 | 83 |
| Sample 2 | 10 | — | — | 96 | 99 |
|  | 200 | Not observed | Not observed | 86 | 81 |
| Sample 3 | 10 | — | — | 98 | 99 |
|  | 200 | Not observed | Not observed | 86 | 84 |
| Sample 4 | 10 | — | — | 98 | 99 |
|  | 200 | Not observed | Not observed | 88 | 88 |
| Sample 5 | 10 | — | — | 94 | 99 |
|  | 200 | Not observed | Not observed | 87 | 87 |
| Sample C1 | 10 | — | — | 80 | 99 |
|  | 200 | observed | observed | 60 | 61 |

As shown in Table 1, in the evaluation of the initial state of the electrode, deformation is not observed in samples 1-5. On the other hand, deformation is observed in sample C1. This is thought to be because columnar bodies are formed on convex portions having different height, so that the intervals between columnar bodies are effectively increased, preventing columnar bodies from being brought into contact with each other at the time of expansion.

As shown in Table 2, in comparison of the charge and discharge cycle characteristics of samples 1-5 and sample C1, in the initial ten cycles, there is no difference in the capacity maintenance rate. However, after 200 cycles, samples 1-5 show an excellent capacity maintenance rate of not less than 80% while a capacity maintenance rate of sample C1 is reduced to about 61%.

Figure 11A:
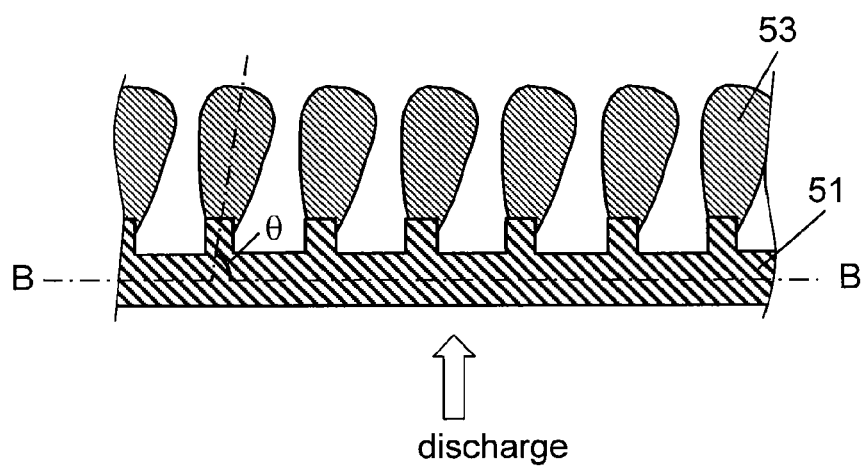
FIG. 11A is a partial schematic sectional view showing a state of a conventional negative electrode before charging.
Figure 11B:
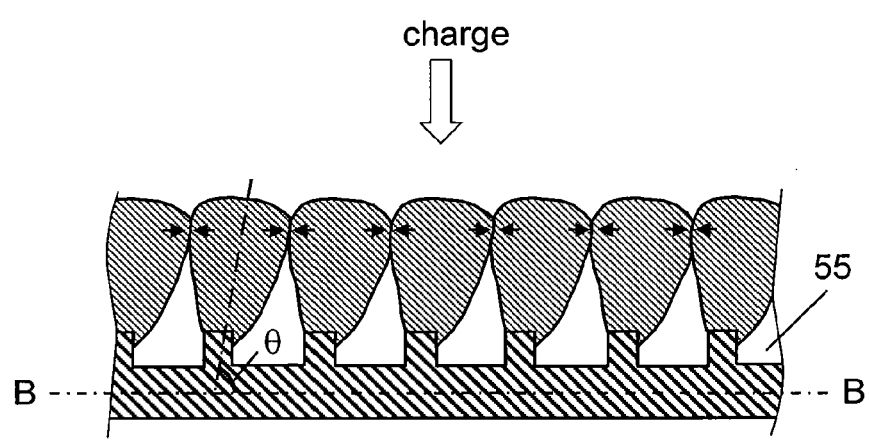
FIG. 11B is a partial schematic sectional view showing a state of a conventional negative electrode after charging.

Furthermore, as shown in Table 2, in the evaluation of electrodes after 200 cycles, in samples 1-5, exfoliation of the columnar body and deformation of the current collector are not observed. This is thought to be because even if the cycles are repeated, columnar bodies are not easily brought into contact with each other at the time of expansion. On the other hand, in sample C1, exfoliation of the columnar body and deformation of the current collector are observed. This is thought to be because the columnar bodies are brought into contact with each other due to expansion as shown in FIGS. 11A and 11B.

Furthermore, as shown in Table 2, in comparison of the high-rate characteristics of samples 1-5 and sample C1, after ten cycles, samples 1-5 show an excellent high rate ratio of not less than 90% while the high-rate characteristic of sample C1 shows about 80%. This is thought to be because the columnar bodies are not easily brought into contact with each other at the time of expansion, so that lithium ions in the electrolytic solution move smoothly.

On the other hand, after 200 cycles, the high-rate characteristic of samples 1-5 show not less than 80% while the high-rate characteristic of sample C1 is reduced to about 60%. This is thought to be because exfoliation of the columnar body and deformation of the current collector, in addition to the above-mentioned causes, inactivate the active material and make the reaction heterogeneous in sample C1.

Furthermore, as shown in Table 2, in comparison of samples 1-3, the high-rate ratio and the capacity maintenance rate are not substantially different due to the height of the first convex portion. However, in sample 2 in which the first convex portion is low, the capacity maintenance rate is somewhat reduced. The reason of this is thought to be as follows. Since the height of the columnar body is the same, the columnar bodies are easily brought into contact with each other in sample 2 in which the difference in height of the first convex portion and that of the second convex portion is small.

Furthermore, when sample 1 is compared with samples 4 and 5, the high-rate ratio and the capacity maintenance rate of samples 4 and 5 tend to be somewhat improved as compared with sample 1. The reason of this is thought to be as follows. In sample 4, the columnar body is formed in n stages, so that the expansion of the columnar body as a whole is suppressed, and contact between the columnar bodies does not easily occur. In sample 5, the columnar body is formed in a radial shape, so that even if the columnar bodies are brought into contact with each other, stress at the time of contact is absorbed by gap portions inside the columnar bodies.

In the above-mentioned Examples, an example in which Si and $SiO_x$ are used as an active material for the columnar body is described. However, the material is not particularly limited to them as long as the material is an element capable of reversibly absorbing and releasing lithium ions. It is preferable that the material is at least one of Al, In, Zn, Cd, Bi, Sb, Ge, Pb, Sn, and the like. Furthermore, as the active material, materials other than each of the above-mentioned elements may be included. For example, transition metals or elements belonging to 2A group may be included.

In the present invention, the shape and formation interval of convex portions formed on a current collector are not particularly limited to the description mentioned in the above-mentioned exemplary embodiments. The shape may include any shapes as long as they can form an obliquely rising columnar body.

Furthermore, an obliquely rising angle made by a center line of a columnar body and a center line of a current collector as well as the shape and dimension of a columnar body are not particularly limited to the above-mentioned exemplary embodiments but they may be appropriately changed according to the manufacturing method of a negative electrode and characteristics necessary to a non-aqueous electrolyte secondary battery to be used.

INDUSTRIAL APPLICABILITY

An electrode for an electrochemical element of the present invention can provide an electrochemical element such as a non-aqueous electrolyte secondary battery excellent in charge and discharge cycle characteristic. Therefore, it is useful in a secondary battery for portable type electronic equipment such as cellular phone and PDA and for large-size electronic equipment, which are expected to be demanded in the future.

The invention claimed is:

1. An electrode for an electrochemical element reversibly absorbing and releasing lithium ions, comprising:
    a current collector having a higher first convex portion and a lower second convex portion on at least one surface thereof;
    a columnar body including an active material formed in such a manner as to rise obliquely on the first convex portion and the second convex portion of the current collector,
    wherein the first convex portion and the second convex portion are provided in rows and in a direction in which the columnar body rises obliquely, and the first convex portion and the second convex portion are alternatively disposed in a direction orthogonal to the direction in which the columnar body rises obliquely.

2. The electrode for electrochemical element of claim 1, wherein a content ratio of an element in the columnar body changes sequentially in a width direction in which the columnar body rises obliquely.

3. The electrode for electrochemical element of claim 1, wherein the columnar body includes n stages ($n \geq 2$) of columnar body portions obliquely rising in different directions.

4. The electrode for electrochemical element of claim 3, wherein a content ratio of an element in the columnar body portion changes sequentially in a width direction in which the columnar body portion rises obliquely, and a direction in which the content ratio changes is different between odd-numbered stages and even-numbered stages.

5. The electrode for electrochemical element of claim 1, wherein the active material includes at least a material having a theoretical capacity density for reversibly absorbing and releasing lithium ions of more than 833 $mAh/cm^3$.

6. The electrode for electrochemical element of claim 5, wherein the material includes at least a material containing silicon and expressed by $SiO_x$ wherein $0 \leq x \leq 2$.

7. The electrode for electrochemical element of claim 6, wherein the columnar body includes n stages ($n \geq 2$) of columnar body portions obliquely rising in different directions, and a value of x of the material containing silicon and expressed by $SiO_x$ continuously increases from an acute angle side to an obtuse angle side with respect to an intersection angle between a center line in an obliquely rising direction of the columnar body and the columnar body portion and a center line in the width direction of the current collector.

8. An electrochemical element comprising:
    an electrode for an electrochemical element of claim 1;
    an electrode for reversibly absorbing and releasing lithium ions; and a non-aqueous electrolyte.

9. An electrode for an electrochemical element reversibly absorbing and releasing lithium ions, comprising:
    a current collector having a higher first convex portion and a lower second convex portion on at least one surface thereof;
    a columnar body including an active material formed in such a manner as to rise obliquely on the first convex portion and the second convex portion of the current collector,
    wherein a content ratio of an element in the columnar body changes sequentially in a width direction in which the columnar body rises obliquely.

10. An electrode for an electrochemical element reversibly absorbing and releasing lithium ions, comprising:
    a current collector having a higher first convex portion and a lower second convex portion on at least one surface thereof;
    a columnar body including an active material formed in such a manner as to rise obliquely on the first convex portion and the second convex portion of the current collector,
    wherein the columnar body includes n stages ($n \geq 2$) of columnar body portions obliquely rising in different directions, and
    a content ratio of an element in the columnar body portion changes sequentially in a width direction in which the columnar body portion rises obliquely, and a direction in which the content ratio changes is different between odd-numbered stages and even-numbered stages.

11. An electrode for an electrochemical element reversibly absorbing and releasing lithium ions, comprising:
- a current collector having a higher first convex portion and a lower second convex portion on at least one surface thereof;
- a columnar body including an active material formed in such a manner as to rise obliquely on the first convex portion and the second convex portion of the current collector, wherein the first convex portion and the second convex portion are provided in different positions in a direction in which the columnar body rises obliquely, and a content ratio of an element in the columnar body changes sequentially in a width direction in which the columnar body rises obliquely.

* * * * *